US006908563B2

(12) United States Patent
Tokunaga

(10) Patent No.: US 6,908,563 B2
(45) Date of Patent: Jun. 21, 2005

(54) INK-JET HEAD, AND METHOD FOR MANUFACTURING THE SAME

(75) Inventor: Hiroyuki Tokunaga, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 368 days.

(21) Appl. No.: 10/301,747

(22) Filed: Nov. 22, 2002

(65) Prior Publication Data

US 2003/0098900 A1 May 29, 2003

(30) Foreign Application Priority Data

Nov. 27, 2001 (JP) ....................................... 2001-361072

(51) Int. Cl.[7] ......................... G01D 15/00; G11B 5/127

(52) U.S. Cl. ......................................................... 216/27

(58) Field of Search .......................... 216/27; 29/890.1; 438/21; 347/20, 44, 54, 55, 56, 63, 65, 67, 71, 74, 29, 40

(56) References Cited

U.S. PATENT DOCUMENTS

| | | | | |
|---|---|---|---|---|
| 5,218,376 A | | 6/1993 | Asai ........................... | 346/1.1 |
| 5,232,766 A | | 8/1993 | Tokunaga ................... | 428/209 |
| 5,322,594 A | * | 6/1994 | Bol ............................. | 216/27 |
| 6,155,673 A | | 12/2000 | Nakajima et al. ............. | 347/61 |

FOREIGN PATENT DOCUMENTS

| | | |
|---|---|---|
| EP | 1 090 761 | 4/2001 |
| EP | 1 108 549 | 6/2001 |
| EP | 1 125 746 | 8/2001 |
| JP | 64-49662 | 2/1989 |
| JP | 4-10940 | 1/1992 |
| JP | 5-261932 | 10/1993 |
| JP | 5-279114 | 10/1993 |
| JP | 6-246946 | 9/1994 |
| JP | 2002-46283 | 2/2002 |
| JP | 2002-326360 | 11/2002 |

* cited by examiner

*Primary Examiner*—Gregory Mills
*Assistant Examiner*—Roberts Culbert
(74) *Attorney, Agent, or Firm*—Fitzpatrick, Cella, Harper & Scinto

(57) ABSTRACT

In order to provide a low-cost large substrate for full multi-bubble-jet head, a method for manufacturing an ink-jet head in which ink-discharge-pressure generation elements are provided on a substrate, discharge ports are disposed in a plate facing the ink-discharge-pressure generation elements, and ink is discharged from the discharge ports by generating bubbles within ink includes the steps of forming a threaded port, serving as an ink supply port, in a ceramic substrate, filling the threaded ports with a filler by melting the filler, flattening a portion of the threaded port filled with the filler in the substrate, depositing a silicon nitride film on the surface of the substrate in which the portion of the threaded port is flattened, depositing a layer made of a high-heat-conduction material on the silicon nitride film, forming the ink-discharge-pressure generation elements on the high-heat-conduction layer, forming ink discharge portions having the corresponding discharge ports on the substrate having the ink-discharge-pressure generation elements, and removing the filler from the substrate having the ink discharge portions.

14 Claims, 18 Drawing Sheets

INK-JET HEAD, AND METHOD FOR MANUFACTURING THE SAME

BACKGROUND OF THE INVENTION

1. Field of the Invention

The present invention relates to an ink-jet head that discharges a desired liquid by supplying the liquid with energy from the outside, and a method for manufacturing the same.

2. Description of the Related Art

An ink-jet recording method is known in which the generation of a bubble is urged by supplying ink with energy, such as heat or the like, the ink is discharged from a discharging port utilizing a change in the volume of the ink, and an image is formed by causing the ink to adhere onto a recording medium. In the ink-jet recording method, side-shooter-type ink-jet heads in which ink is discharged perpendicularly to a substrate are known as one type of ink-jet heads.

As for the side-shooter-type ink-jet head, Japanese Patent Application Laid-Open (Kokai) No. 4-10940 (1992) discloses a configuration in which, in order to supply discharge-pressure generation elements on a surface of a substrate with ink from the back of the substrate, an ink supply port threaded through a single-crystal Si substrate is formed according to anisotropic etching.

In conventional side-shooter-type ink-jet heads, an ink supply port is formed from the back of a substrate according to anisotropic etching that utilizes the fact that the etching speed differs depending on the orientation of a crystal face of single-crystal Si. Accordingly, the substrate is limited to a single-crystal Si substrate, and the size of a manufactured ink-jet head is limited by the size of the single-crystal Si substrate. Another problem is that a large amount of time, i.e., 7–16 hours, is required for performing anisotropic etching of Si.

The inventor of the present invention has proposed, in Japanese Patent Application Laid-Open (Kokai) No. 1-49662 (1989), a technique in which compatibility of excellent heat conduction and a low cost is realized by using alumina as a substrate material other than silicon, and depositing silicon on an alumina substrate.

It is considered that, by using such a substrate, reduction in the production cost and the processing time is realized. However, when forming a threaded hole using the substrate disclosed in Japanese Patent Application Laid-Open (Kokai) No. 1-49662 (1989), a silicon layer sometimes peels at portions surrounding the threaded hole.

SUMMARY OF THE INVENTION

It is an object of the present invention to solve the above-described problems.

According to one aspect, the present invention provides a method for manufacturing an ink-jet recording head in which ink-discharge-pressure generation elements are provided on a substrate, discharge ports are disposed in a plate facing the ink-discharge-pressure generation elements, and ink is discharged from the discharge ports by generating bubbles within ink. The method includes the steps of forming a threaded port, serving as an ink supply port, in a ceramic substrate, filling the threaded ports with a filler by fusing the same, flattening a portion of the threaded port filled with the filler in the substrate, depositing a silicon nitride film on the surface of the substrate in which the portion of the threaded port is flattened, depositing a layer made of a high-heat-conduction material on the silicon nitride film, forming the ink-discharge-pressure generation elements on the high-heat-conduction layer, forming ink discharge portions having the corresponding discharge ports on the substrate having the ink-discharge-pressure generation elements, and removing the filler from the substrate having the ink discharge portions.

According to another aspect, the present invention provide a substrate for an ink-jet head having ink-discharge-pressure generation elements for discharging ink. The substrate includes a ceramic substrate having a threaded hole, a silicon nitride film formed on a surface of the ceramic substrate where the ink-discharge-pressure generation elements are to be formed, and a layer made of a high-heat-conduction material formed on the silicon nitride film.

According to still another aspect, the present invention provides an ink-jet head including a ceramic substrate having a threaded hole, serving as an ink supply port, a silicon nitride film deposited on a side of the ceramic substrate where ink-discharge-pressure generation elements are to be formed, a layer made of a high-heat-conduction material formed on the silicon nitride film, a heat storage layer deposited on the high-heat-conduction layer, ink-discharge-pressure generation elements for discharging ink that are formed on the heat storage layer, ink discharge ports formed on corresponding ones of the ink-discharge-pressure generation elements, and an ink channel for connecting the ink discharge ports to respective portions of an ink supply port.

In the present invention, by forming threaded holes in an inexpensive ceramic substrate, flattening the surface of the substrate by filling the threaded holes with a heat-resistant filler, and depositing a silicon layer having excellent heat conductivity on the surface of the substrate via a silicon nitride film, a substrate for an ink-jet head that can endure a high-temperature process, such as CVD (chemical vapor deposition) or the like, is provided.

The foregoing and other objects, advantages and features of the present invention will become more apparent from the following detailed description of the preferred embodiments taken in conjunction with the accompanying drawings.

DETAILED DESCRIPTION OF THE PREFERRED EMBODIMENTS

The present invention will now be described in detail with reference to the drawings.

Figure 1:
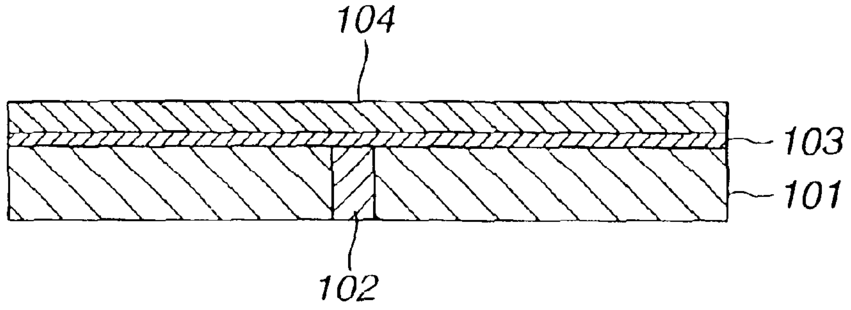
FIG. 1 is a schematic cross-sectional view illustrating a substrate for an ink-jet head according to the present invention.

FIG. 1 is a schematic cross-sectional view illustrating a substrate for an ink-jet head according to the present invention. FIGS. 3A–8B and FIGS. 10A–10D are schematic cross-sectional views illustrating processes for manufacturing an ink-jet recording nozzle according to the present invention.

Figure 2:
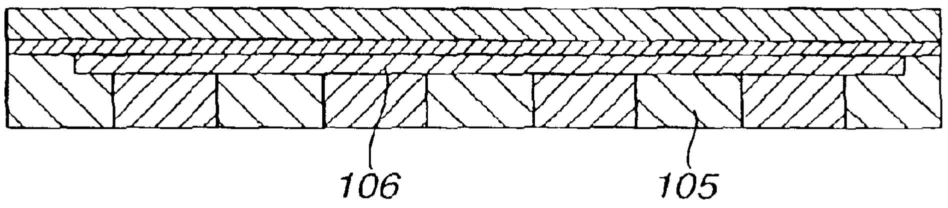
FIG. 2 is a schematic cross-sectional view illustrating the substrate shown in FIG. 1, as seen from another side.

In FIG. 1, a ceramic material, such as SiC, alumina, aluminum nitride, glass or the like, is used as a substrate 101. A threaded hole 102 for supplying a central portion of the substrate 101 with ink from the back of the substrate 101 is formed. If the width of arrangement of ink-jet-head nozzles is large, the strength of the substrate 101 tends to decrease, because the threaded hole 102, serving as a supply port, is provided longitudinally through a central portion of the substrate 101. In order to solve this problem, as shown in FIG. 2 (a cross-sectional view of the substrate 101, as seen from another side), the supply port is divided into a plurality of portions, and the strength of the substrate 101 is increased by providing beams 105 within the support port. An upper portion 106 of the beam 105 (on a side where ink-discharge-pressure generation elements are to be formed) has the shape of a continuous groove so as not to become resistance for an ink channel. The supply port can be processed according to dicing, laser processing or the like.

The processed ink supply port is filled with a material having a high heat resisting property, because the supply port must thereafter be processed according to a thin-film process in a high-temperature atmosphere.

A material having a high heat resisting property, and preferably, having a linear coefficient of thermal expansion relatively close to that of the substrate 101 may be used as the filling material. For example, Si, Ge, Sn, or an alloy of some of these elements may be used as the filling material. A resin, such as heat-resistant polyimide, heat-resistant polyamide or the like, may also be used.

For example, filling by a filler when using an inorganic material as the filler is performed in the following manner.

Figures 10A, 10B, 10C, 10D:
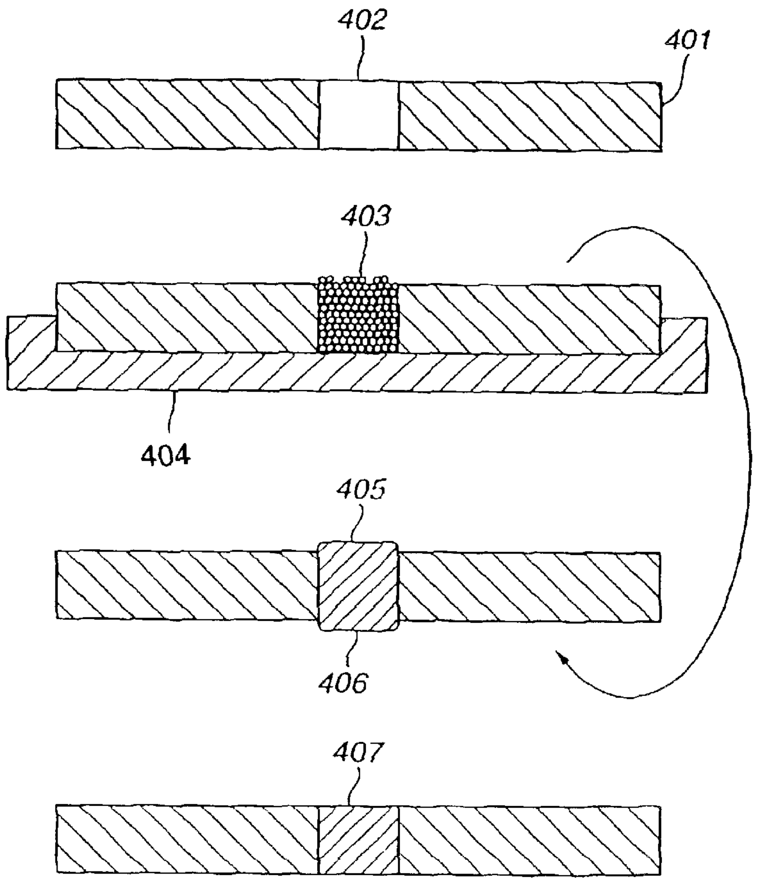
FIGS. 10A–10D are cross-sectional views illustrating an intermediate process for manufacturing an ink-jet head of the invention.

First, as shown in FIG. 10B, a substrate 401 is placed on a boat 404 for heating whose surface is flat, and the powder of an inorganic material 403, serving as the filler, is filled in a formed supply port 402.

Then, by heating the inorganic filler to a temperature higher than the melting point of the filler, the inorganic material is made in a polycrystalline state, and the state of filling within the supply port 402 is made dense.

Then, the projected filled portion is flattened by being polished according to lapping or the like.

The inventor of the present invention has confirmed effectiveness of the above-described substrate by performing the following experiments.

(Experiment 1)

As shown in FIG. 10A, the ink supply port 402 was formed in the ceramic substrate 401 according to mechanical processing. In order fill the ink supply port 402, an experiment as shown in FIGS. 10A–10D was performed. As shown in FIG. 10B, Si powder 403 having particle diameters equal to or less than 50 μm was filled in the ink supply port 404 of the substrate 401 in tight contact with the carbon boat 404 for heating, and the atmospheric temperature of the boat 404 was raised to 1,500° C. to fill the supply port 402 with polycrystalline Si.

A side 405 that contacted the boat 404 was polished using colloidal silica having a particle diameter of 1 μm to form a flat substrate surface 407. A large void exceeding 5,000 Å was not found in the supply port 402 at the surface of the substrate 401.

(Experiment 2)

An experiment was performed by changing the filler to Ge powder in the same configuration as in Experiment 1. The supply port 402 was tightly filled with Ge at a melting temperature of 980° C. After polishing, a large void exceeding 5,000 Å was not found on the surface 407 of the substrate 401 that contacted the boat 404.

According to the above-described experiments, it is confirmed that the above-described fillers can be applied to the present invention.

Figure 3A:
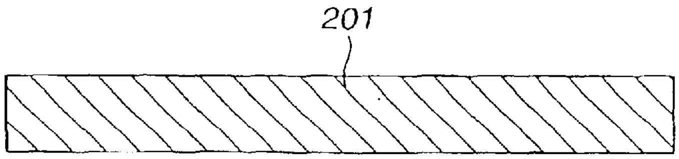
FIGS. 3A–3F are schematic cross-sectional views illustrating process flows for manufacturing an ink-jet head according to a first embodiment of the present invention.
Figure 3B:
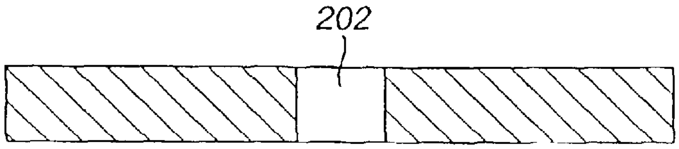
Figure 3C:
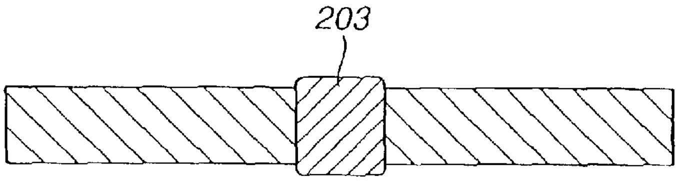
Figure 3D:
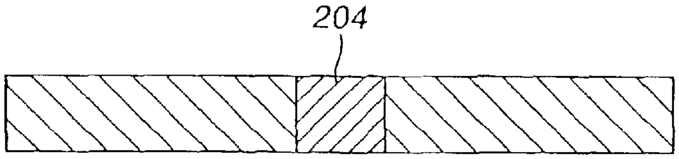
Figure 3E:
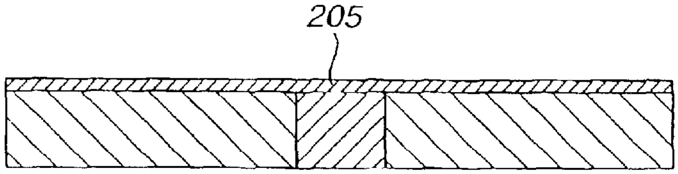
Figure 3F:
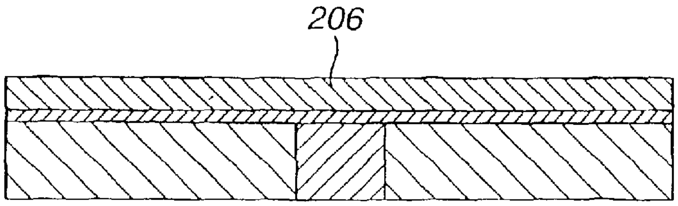
Figure 4A:
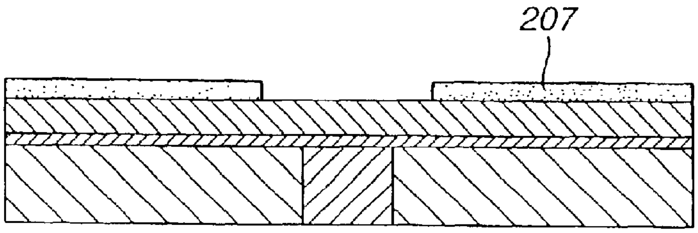
FIGS. 4A–4C are schematic cross-sectional views illustrating process flows for manufacturing the ink-jet according to the first embodiment, after the state shown in FIG. 3F.
Figure 4B:
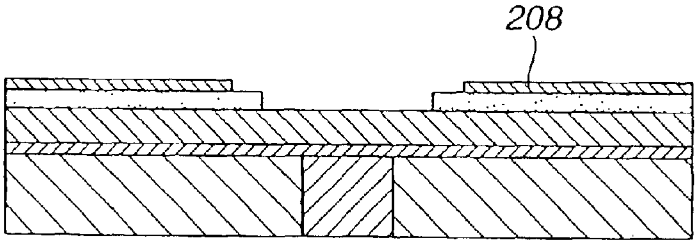
Figure 4C:
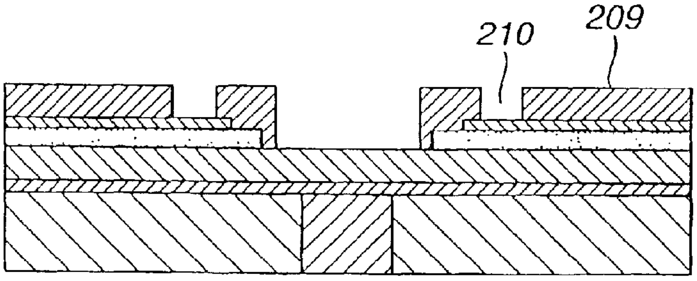

Then, a silicon nitride film is deposited on such a substrate 201 according to CVD, sputtering or the like, to provide a etching stop layer 205 (see FIG. 3E). The thickness of the deposited etching stop layer 205 is usually 5,000 Å–3 μm, preferably 8,000–25,000 Å, and optimally 1–2 μm. The total stress in the deposited etching stop layer 205 is usually equal to or less than $2\times10^{-9}$ dyne/cm$^2$, preferably equal to or less than $1.8\times10^{-9}$ dyne/cm$^2$, and optimally equal to or less than $1.5\times10^{-9}$ dyne/cm$^2$. This silicon nitride film, serving as the etching stop layer 205, also prevents peeling of a layer made of a high-heat-conduction material. A silicon carbide film or a film made of some metal other than the silicon nitride film may also be used as a material that has an excellent adhesive property and that can excellently transmit heat from the high-heat-conduction layer to the ceramic substrate. However, since it is very difficult to control the stress of the film in these films, it is difficult to prevent peeling of the high-heat-conduction layer as the silicon nitride film can do.

Then, a polysilicon layer 206 (see FIG. 3F) is deposited as the high-heat-conduction layer according to CVD, a melt coating method or the like, to a thickness of 10–40 μm, in order to dissipate heat from ink-jet discharge elements. Doped polysilicon, tungsten, SiC or the like that has excellent thermal conductivity may be used for the high-heat-conduction layer.

Then, a heat storage layer 207 (see FIG. 4A) is formed by depositing a SiN or $SiO_2$ film according to CVD, sputtering or the like and patterning the deposited film. Then, a lower wire layer 208 (see FIG. 4B) is formed on the heat storage layer 207 by depositing a film made of Al, Cu or an alloy of these elements according to CVD, sputtering or the like and patterning the deposited film.

Then, an interlayer insulating film 209 (see FIG. 4C) is formed by depositing a film made of SiN, SiON, $SiO_2$ or the like according to plasma CVD or the like. Then, contact holes 210 are formed in the interlayer insulating film 209.

Then, heater portions 212 (see FIG. 5A) are formed as ink-discharge-pressure generation elements at positions adapted to the ink supply port. A metal film made of Ta, TaN, TaNSi or the like is deposited according to sputtering, vacuum deposition or the like, and the deposited film is patterned to provide heaters. Then, A metal film made of Al, Mo, Ni, Cu or the like is formed in the same manner, to provide upper electrodes 211 for supplying electric power.

Then, a SiN film 213 (see FIG. 5B) is deposited as a protective layer according to plasma CVD in order to improve durability of the heaters.

Figure 5A:
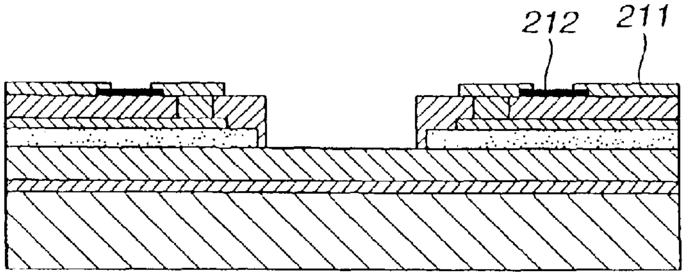
FIGS. 5A–5D are schematic cross-sectional views illustrating process flows for manufacturing the ink-jet head according to the first embodiment, after the state shown in FIG. 4C.
Figure 5B:
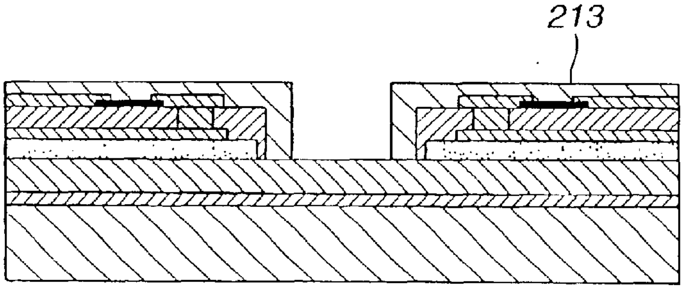
Figure 5C:
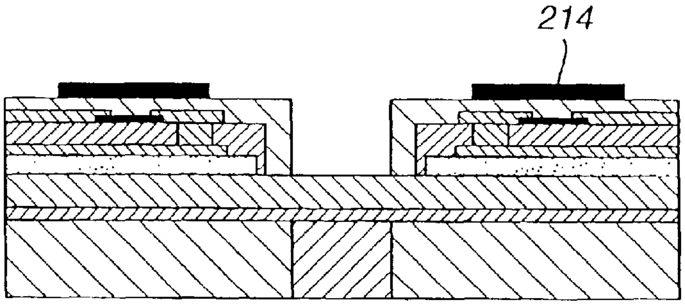
Figure 5D:
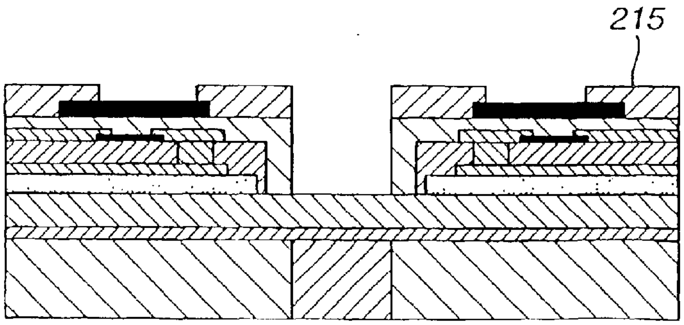

Then, a Ta film is deposited according to sputtering or the like and the deposited film is patterned to provide cavitation-resistant films 214 (see FIG. 5C). The thickness of the cavitation-resistant film 214 is preferably 1,000–5,000 Å, more preferably 2,000–4,000 Å, and optimally 2,500–3,500 Å.

There is, of course, no limitation in the order of formation of wires, heaters and the like.

In order to improve the adhesive property of nozzles made of resin, a resin film 215 having a high corrosion resisting property is formed, and heater portions and ink supply portions are patterned.

In order to secure an ink channel, a channel pattern 216 (see FIG. 6A) is formed using a resin that can be dissolved by a strong alkali, an organic solvent or the like, according to printing, patterning using a photosensitive resin, or the like. A coated resin layer 217 (see FIG. 6B) is formed on the channel pattern 216. It is preferable to use a photosensitive resist for the coated resin layer 217, because a fine pattern is formed. The coated resin layer 217 also must have a property of not being deformed and altered by an alkali, a solvent or the like used when removing the resin layer forming the channel.

Then, by patterning the coated resin layer 217 for the channel, ink discharge ports 218 and external connection portions for electrodes are formed at portions corresponding to the heater portions. Then, the coated resin layer 217 is cured by light, heat or the like.

In order to protect the surface of the substrate where the nozzles are to be formed, a protective film 219 (see FIG. 6C) is formed by a resin.

An ink supply port 220 (see FIG. 7A) is formed by etching the filler filled in the ink supply port by immersing the substrate 201 in an alkaline etchant (KOH, TMAH, hydrazine or the like). At that time, etching stops in front of the etching stop layer 205.

By partially removing SiN of the etching stop layer 205 by a chemical, such as hydrofluoric acid or the like, or according to dry etching or the like, an ink supply port 221 (see FIG. 7B) is provided. Since the protective film is removed, by removing the ink-channel forming material, a channel 222 for ink (see FIG. 8A) is obtained.

In the above-described processes, the order of processing of the substrate is not limited to a particular order, but may be arbitrarily selected.

Embodiments of the present invention will now be described.

(First Embodiment)

FIG. 1 is a schematic cross-sectional view illustrating a substrate for an ink-jet head according to a first embodiment of the present invention.

In FIG. 1, a threaded hole for supplying ink from the back of an alumina substrate 101 is formed in a central portion of the substrate 101, and a filler 102 is filled in the threaded hole. A SiN thin film is provided on the surface of the substrate 101 as an etching stop layer 103, and a polysilicon layer 104, serving as a high-heat-conduction layer, is formed on the etching stop layer 103 in order to improve heat radiation from heaters for ink discharge.

As shown in FIG. 2 (a cross-sectional view of the substrate 101, as seen from another side), in order to maintain the strength of the substrate 101, an ink supply port (the threaded hole) may be divided into a plurality of portions and beams 105 may be provided within the substrate 101. If the width and the length of the ink supply port are 200 μm and 100 mm, respectively, the beam pitch is 10 mm, and the beam width is 5 mm.

Next, a method for manufacturing the ink-jet head according to the first embodiment will be described in detail with reference to FIGS. 3A–8B.

First, a threaded hole 202, serving as a supply port for supplying ink from the back of an alumina substrate 201, was formed at a central portion of the alumina substrate 201 having an outer diameter of 6 inches and a thickness of 1 mm, by performing cutting using a dicer. The width and the length of the ink supply port were 200 μm and 100 mm, respectively.

The processed substrate 201 was placed on a carbon boat, and Ge powder having particle diameters equal to or less than 50 μm was filled in the supply port in a state in which the upper portion of the supply port was blocked. Then, by melting the Ge powder by heating it at 980° C., the Ge power was made in a polycrystalline state, in order to provide a dense packed state.

Then, after cooling the substrate 201, a projected portion comprising polycrystalline Ge at the filled portion was flattened by being ground using colloidal abrasive grains having particle diameters of 8,000–4,000 Å.

By this flattening, projections and recesses at the supply port portion were suppressed to values equal to or less than 5,000 Å.

An etching stop layer 205 made of SiN that operates during anisotropic etching was deposited on the flattened substrate to a thickness of 2 μm according to plasma CVD, in film forming conditions of $SiH_4/NH_3/N_2$=160/400/2,000 sccm (standard cubic centimeters per minute), a pressure of 1,600 mtorr, a substrate temperature of 300° C., and RF (radio frequency) power of 1,400 W.

Then, a P-doped polysilicon layer 206 was deposited on the SiN layer 205 to a thickness of 20 μm according to plasma CVD, in film forming conditions of $SiH_4/PH_3$ (diluted to 0.5% by $H_2$)/$H_2$=250/200/1,000 sccm, a pressure of 1,200 mtorr, a substrate temperature of 300° C., and RF power of 1.6 kW. After the film deposition, the polysilicon layer was ground by the colloidal abrasive grains mentioned above, and was flattened to 15 $\mu$m.

Then, a $SiO_2$ film was deposited on the polysilicon layer 206 to a thickness of 8,000 Å according to plasma CVD, and the deposited film was patterned to form a heat storage layer 207, in film forming conditions of $SiH_4/N_2O/N_2$=250/1,200/4,000 sccm, a pressure of 1,800 mtorr, a substrate temperature of 300° C., and RF power of 1,800 W.

Then, lower wire electrodes 208 were formed by depositing an AlCu film to a thickness of 3,000 Å and patterning the deposited film.

Then, interlayer insulating films 209 were formed by depositing a $SiO_2$ film to a thickness of 1,200 Å according to plasma CVD in the same conditions as in the case of forming the lower wire electrodes 208.

Then, contact holes 210 were formed in the respective interlayer insulating films 209.

Heater portions 212 were formed at portions adapted to the ink supply port, as ink-discharge-pressure generation elements. More specifically, a TaSiN film (Ta:Si:N=43:42:15), serving as a heater layer, was deposited on the interlayer insulating film 209 to a thickness of 500 Å according to sputtering, and then an AlCu film (Al:Cu=99.5:0.5), serving as an upper electrode 211 for supplying electric power was deposited to a thickness of 2,000 Å according to sputtering. A laminated structure comprising the heater layer and the electrode wire layer was formed by performing pattering according to photolithography. This AlCu film also enters the above-described through hole to be connected to the lower electrode wire. The size of the heater portion 212 was 24×24 $\mu$m.

Figure 9:
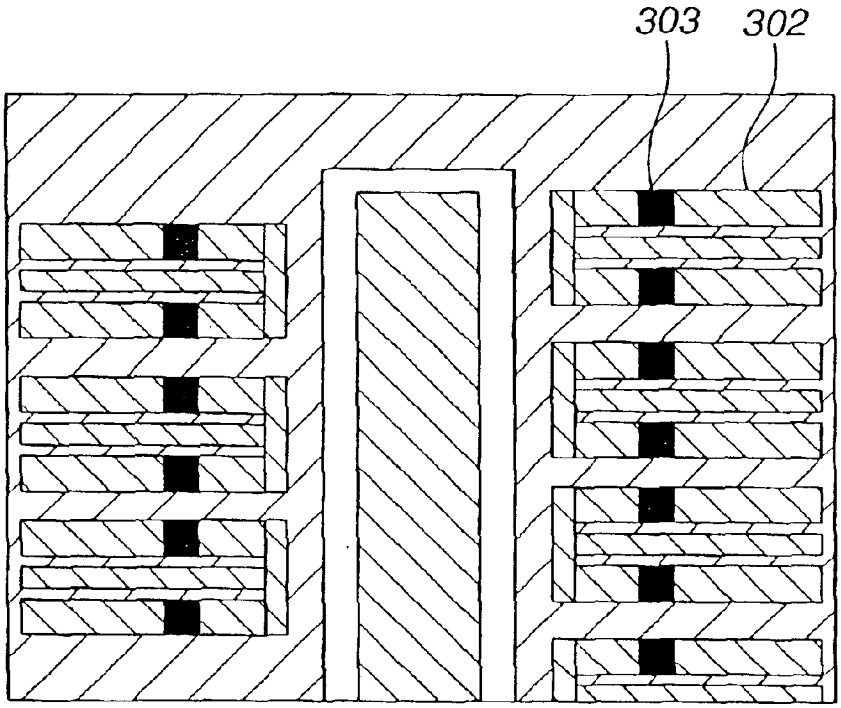
FIG. 9 is a plan view illustrating a substrate for an ink-jet head according to the first embodiment.

In the above-described configuration, the wire electrodes connected to the heater are vertically folded. However, as shown in FIG. 9, wire electrodes 302 may be horizontally folded, and an individual signal supply line and a grounding power supply portion at a downstream portion may be formed with the same wire.

In order to improve durability, a SiN film 213 was deposited on the heater and the upper electrode to a thickness of 3,000 Å according to plasma CVD.

Then, a cavitation-resistant film 214 was formed on the SiN film 213 by depositing a Ta film to a thickness of 2,300 Å according to sputtering and patterning the deposited film.

In order to improve the adhesive property of nozzles made of a resin, an alkali-resistant film 215 made of HIMAL (a product name, made by Hitachi Chemical Company, Limited) was formed, and portions corresponding to heaters are removed by patterning. An ink-channel mold 216 shown in FIG. 6A was formed by coating polymethyl isopropenylketone (product name: ODUR-1010, made by Hitachi Chemical Company, Ltd.), serving as a photosensitive resin, to a thickness of 20 $\mu$m followed by patterning.

Then, a photosensitive-resin layer 217 was formed by coating a substance containing components shown in Table 1 on the ink-channel mold 216 to a thickness of 12 $\mu$m.

TABLE 1

| | | |
|---|---|---|
| Epoxy resin | o-cresol-type epoxy resin (product name: 180H65, made by Yuka Shell Kabushiki Kaisha) | 100 parts |
| Optical cationic polymerization initiator | 44'-di-t-bytylphenyl iodonium hexafluoroantimonate | 1 part |
| Silane coupling agent | product name: A187, made by Nippon Unikar Kabushiki Kaisha | 10 parts |

Figure 6A:
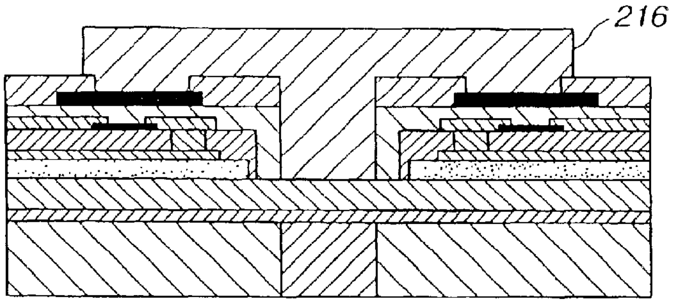
FIGS. 6A–6C are schematic cross-sectional views illustrating process flows for manufacturing the ink-jet head according to the first embodiment, after the state shown in FIG. 5D.
Figure 6B:
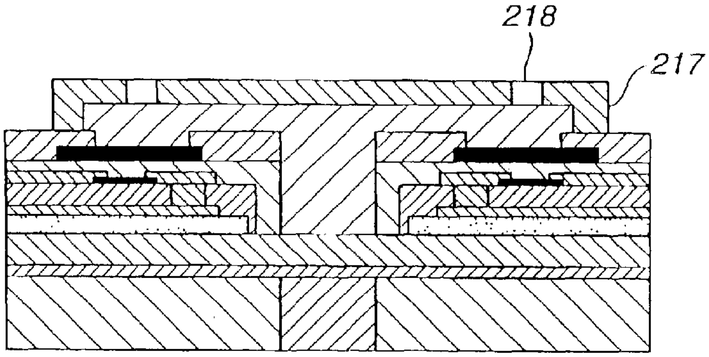
Figure 6C:
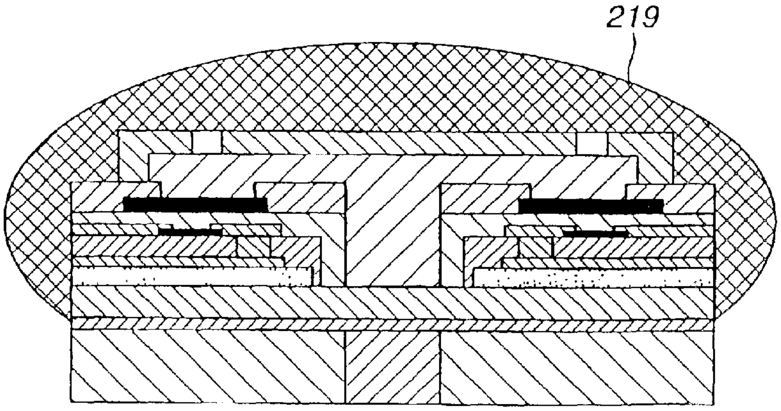

Ink discharge ports 218 shown in FIG. 6B were formed by patterning this photosensitive resin layer 217 according to photolithography.

Then, in order to protect the surface of the photosensitive resin layer 217 where nozzles are to be formed, a protective film 219 made of a rubber-type resist (product name: OBC, made by Tokyo Ohka Kogyo Co., Ltd.) was formed so as to coat the photosensitive resin layer 217.

By immersing this substrate in a 21% TMAH aqueous solution, portions of the substrate to become the supply port were subjected to anisotropic etching, with an etchant temperature of 83° C., and an etching time of 3 hours.

Figure 7A:
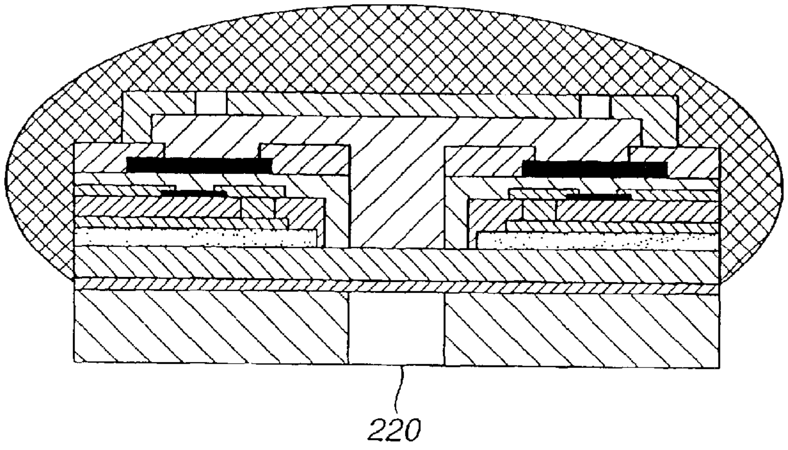
FIGS. 7A and 7B are schematic cross-sectional views illustrating process flows for manufacturing the ink-jet head according to the first embodiment, after the state shown in FIG. 6C.

The etching proceeded as shown in FIG. 7A, and stopped in front of the etching stop layer 205. At that time, no crack was observed in the etching stop layer 205, and penetration of the etching solution into the channel forming resin layer and the nozzle portions was not observed.

Figure 7B:
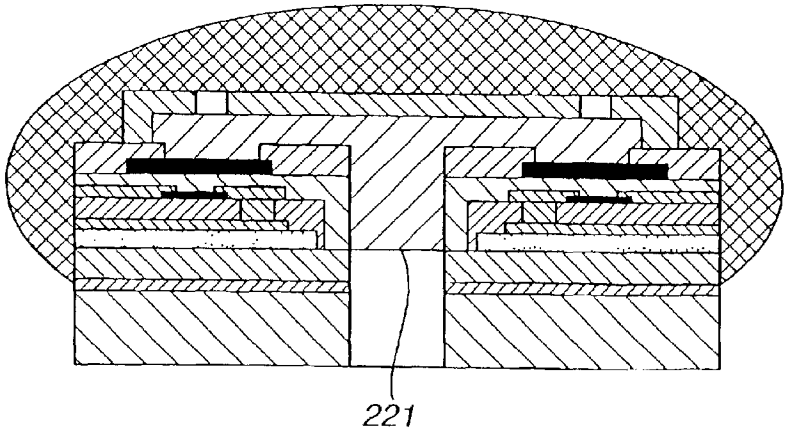

Then, as shown in FIG. 7B, SiN of the etching stop layer 205 and the polysilicon layer 206 on the etching stop layer 205 were removed according to CDE (chemical dry etching), in etching conditions of $CF_4/O_2$=300/250 sccm, RF power of 800 W, and a pressure of 250 mtorr. At that time, since the alumina substrate 201 operates as an etching mask, only the SiN layer 205 and the polysilicon layer 206 at the portion of the supply port 202 are selectively removed. In the CDE, since the etching rate extremely decreases when etching reaches the ink-channel mold 216, the ink-channel mold 216 substantially operates as an etching stop layer.

Figure 8A:
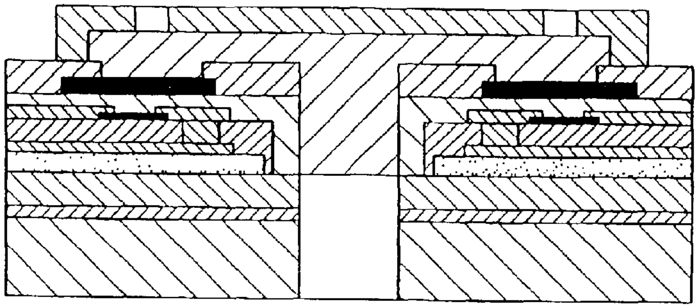
FIGS. 8A and 8B are schematic cross-sectional views illustrating process flows for manufacturing the ink-jet head according to the first embodiment, after the state shown in FIG. 7B.
Figure 8B:
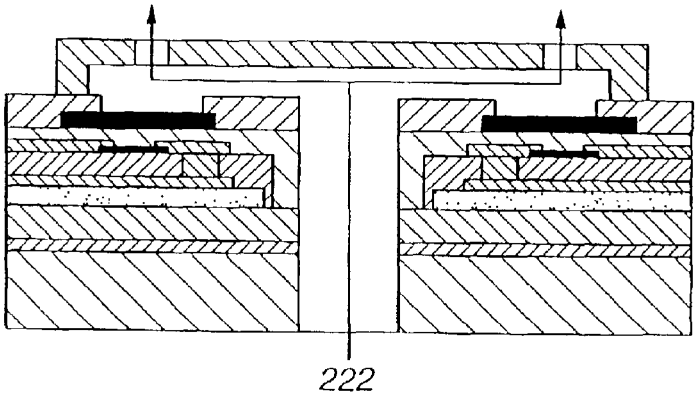

After removing the protective film 219, then, as shown in FIG. 8B, an ink channel 222 was formed by removing the channel forming resin by applying ultrasonic waves in methyl lactate. Thus, an ink-jet head was manufactured.

(Second Embodiment)

An ink-jet head was manufactured in the same manner as in the first embodiment, except that a tungsten layer was deposited instead of the polysilicon layer as the high-heat-conduction layer. The tungsten film was formed in film forming conditions of $WF_6/H_2/SiH_4$=300/3,000/100 sccm, a pressure of 100 mtorr, and a substrate temperature of 400° C.

(Third Embodiment)

An ink-jet head was manufactured in the same manner as in the second embodiment, except that a SiC film was deposited instead of the tungsten layer as the high-heat-conduction layer. The SiC film was formed in film forming conditions of $SiCl_4/C_3H_8/H_2$=500/60/1,400 sccm, the normal pressure, and a substrate temperature of 1,200° C.

Electric external wires were connected to each of the ink-jet heads according to the first through third embodiments, and printing tests were performed with a discharge frequency of 18 kHz. In all of the heads, high-quality prints were obtained in which thinning in printing, unevenness in the print density, and absent of ink discharge were not observed over the entire width of 100 mm.

(Fourth Embodiment)

A fourth embodiment of the present invention will now be described.

Figure 17A:
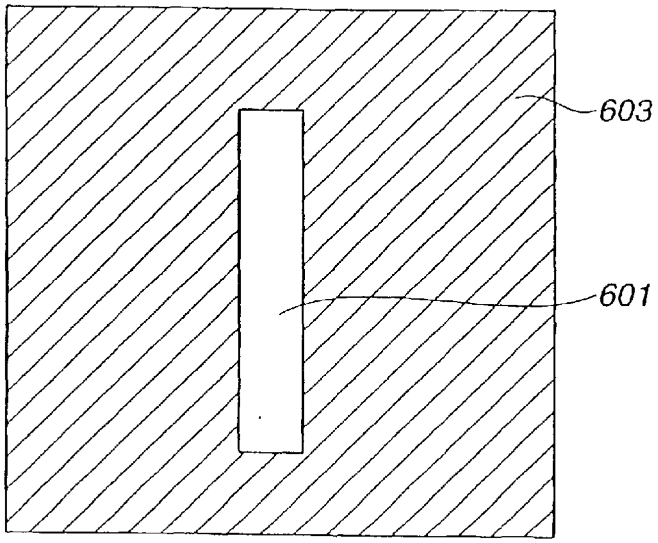
FIGS. 17A and 17B are schematic diagrams, each illustrating a substrate according to the present invention.
Figure 17B:
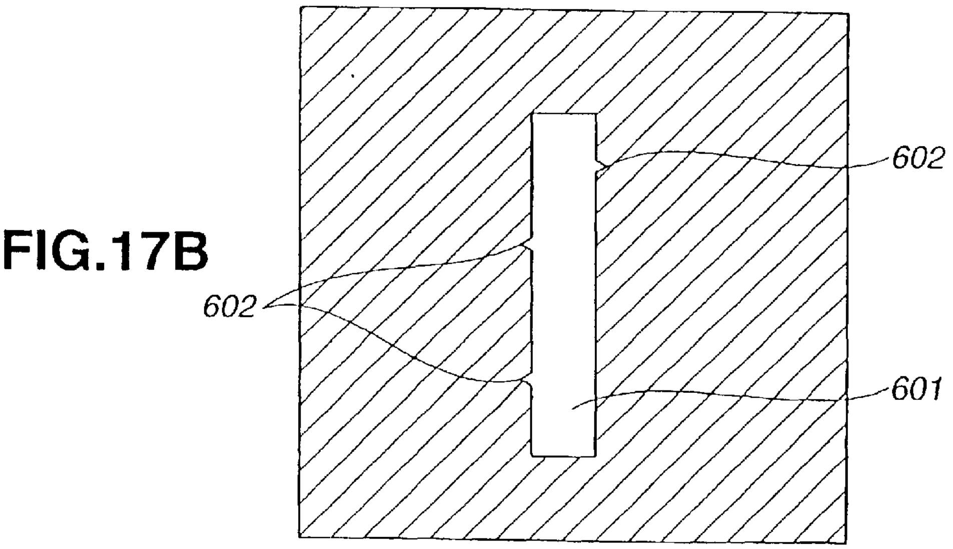

Usually, when forming thin-film elements using a ceramic substrate, a so-called tape forming method in which the ceramic substrate is obtained by firing a green sheet has been adopted. In this method, an original material for a sheet is obtained by adding MgO—$SiO_2$—CaO or the like to alumina particles as a flux, and using a polymethacrylic resin as a binder. In this case, a large number of voids are generated within or on the surface of the sheet. As shown in FIG. 17B, such voids sometimes cause side etching at the portion of a supply port 601. Accordingly, in order to improve the production yield of ink-jet heads, it is desirable to remove such voids.

It is possible to remove such voids by coating the surface of the sheet with a vitreous material in order to flatten the surface, as disclosed in Japanese Patent Application Laid-Open (Kokai) No. 6-246946 (1994). However, this approach is rather undesirable in an ink-jet head that discharges ink utilizing heat generated by heaters, because the thermal conductivity of the coated vitreous layer is inferior.

Japanese Patent Application Laid-Open (Kokai) No. 5-279114 (1993) discloses a technique for reducing voids by selecting the components of a sintering assisting agent. In this technique, however, the area ratio of occupation of voids on the surface of a substrate is still about 4%.

The inventor of the present invention and others have flattened the surface of the upper heat radiation layer by filling voids in a heat-resistant substrate, such as a ceramic substrate or the like, with an inorganic substance having a high heat resisting property. It is thereby possible to form an ink-jet head having a fine wire pattern and capable of performing very precise printing, on an inexpensive ceramic substrate.

Voids on a ceramic substrate are filled according to a method of filling the voids with a melted inorganic substance, and a method of filling the voids by depositing a film according to CVD or the like.

In a method of providing a thick Si layer on a ceramic substrate according to thermal melting, a flattened surface is obtained, for example, in the following manner.

A small piece of Si was mounted on a carbon boat. An alumina substrate was placed on the boat so as to cover the Si piece. The boat was heated to 1,450° C. When Si was completely melted, a pressure equal to or larger than 100 g/cm$^2$ was applied to the substrate, to bring Si and alumina in tight contact while removing bubbles. When the entire assembly was cooled to the room temperature, a hybrid substrate comprising alumina and Si was obtained.

The threaded hole 601 (shown in FIGS. 17A and 17B) was observed from the surface of the substrate when the substrate was etched. As shown in FIG. 17A, no side etching caused by voids was observed.

A material having an excellent heat resisting property and high thermal conductivity may be used for this layer for flattening the surface of the substrate (hereinafter termed a "flattening layer"). More specifically, a material including Si or Ge as a main component may be used.

The flattening layer may be made of the same material as that for the inorganic filler. In this case, by providing the material on the supply port and the surface of the substrate and melting the material, formation of the flattened layer and filling of the inorganic filler can be simultaneously performed.

When separately performing formation of the flattening layer and filling of the inorganic filler, the flattening layer is formed after performing flattening of the inorganic filler. At that time, the inorganic material, such as Si or Ge, after being cut by polishing causes side etching at a portion below the etching stop layer during etching for forming a head. Hence, it is desirable that the thickness of this portion is as small as possible, usually equal to or less than 5 $\mu$m, preferably equal to or less than 3 $\mu$m, and optimally equal to or less than 1 $\mu$m.

The fourth embodiment will now be described in detail with reference to the drawings.

FIGS. 11A–16B are schematic cross-sectional views illustrating processes for forming ink-jet recording nozzles.

First, a threaded hole 402, serving as a supply port for supplying ink from the back of an alumina substrate 401, was formed at a central portion of the alumina substrate 401 having an outer diameter of 6 inches and a thickness of 1 mm, by performing cutting using a dicer. The width and the length of the ink supply port 402 were 200 $\mu$m and 100 mm, respectively.

As shown in FIG. 2, in order to maintain the strength of the substrate 101, the ink supply port is divided into a plurality of portions, and beams 105 are provided within the substrate 101. The beam pitch was 10 mm, and the beam width was 5 mm. The depth of an upper continuous groove 107 was 200 $\mu$m.

Figures 11A, 11B, 11C, 11D, 11E, 11F:
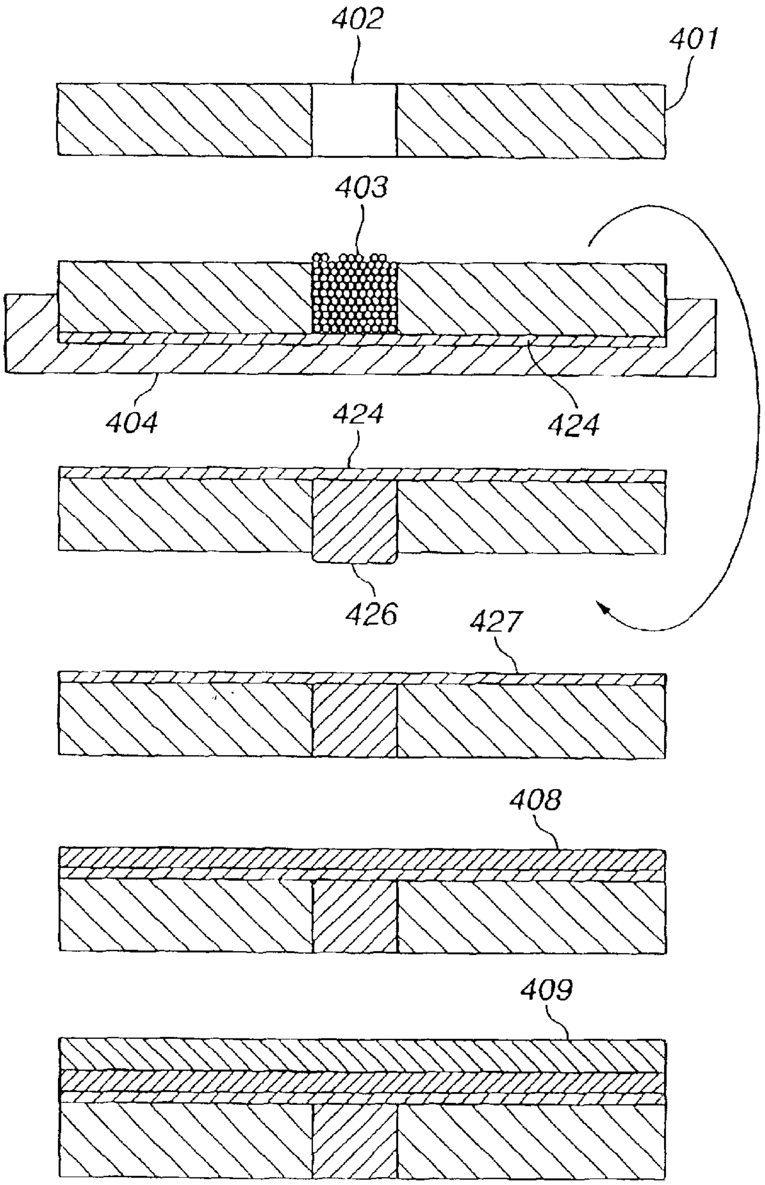
FIGS. 11A–11F are schematic cross-sectional views illustrating process flows for manufacturing an ink-jet head according to a fourth embodiment of the present invention.
Figure 12A:
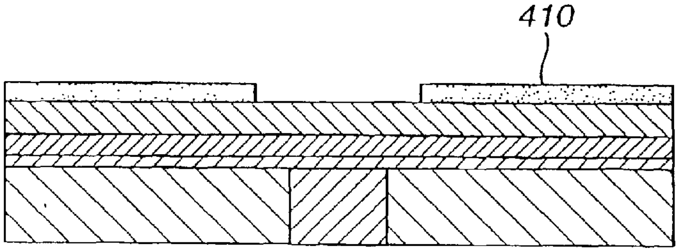
FIGS. 12A–12C are schematic cross-sectional views illustrating process flows for manufacturing the ink-jet head according to the fourth embodiment, after the state shown in FIG. 11F.
Figure 12B:
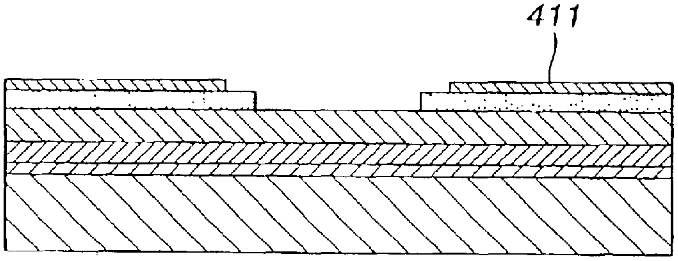
Figure 12C:
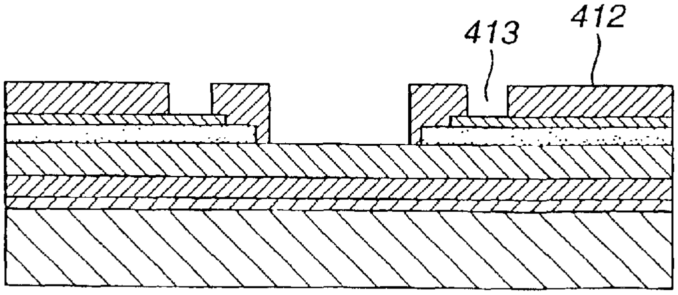

This processed substrate was reversed and mounted on a carbon boat 404 as shown in FIG. 11B. Si powder having particle diameters equal to or less than 50 $\mu$m was filled on the upper surface of the substrate and in the supply port, and was melted at 1,500° C. to form a polysilicon layer 424 and a filled portion 403 of the supply port. At that time, the average thickness of the polysilicon layer 424 on the upper surface of the substrate was 70 $\mu$m. After cooling the entire assembly, the substrate was taken out, and the surface of the substrate was flattened by lapping, to cut the polysilicon layer 427 to a thickness of 2 $\mu$m.

Then, a SiN thin film was deposited to a thickness of 14,000 Å as an etching stop layer 408, in film forming conditions of $SiH_4/NH_3/N_2$=160/400/2,000 sccm, a pressure of 1,600 mtorr, a substrate temperature of 300° C., and RF power of 1,400 W.

Then, in order to improve heat radiation of heaters for ink discharge of the ink-jet head, a P-doped n-type polysilicon layer 409 was deposited on the SiN layer 408, in film forming conditions of $SiH_4/PH_3$ (diluted to 0.5% by $H_2$)/$H_2$=250/200/1,000 sccm, a pressure of 1,200 mtorr, a substrate temperature of 300° C., and RF power of 1.6 kW.

Figure 18:
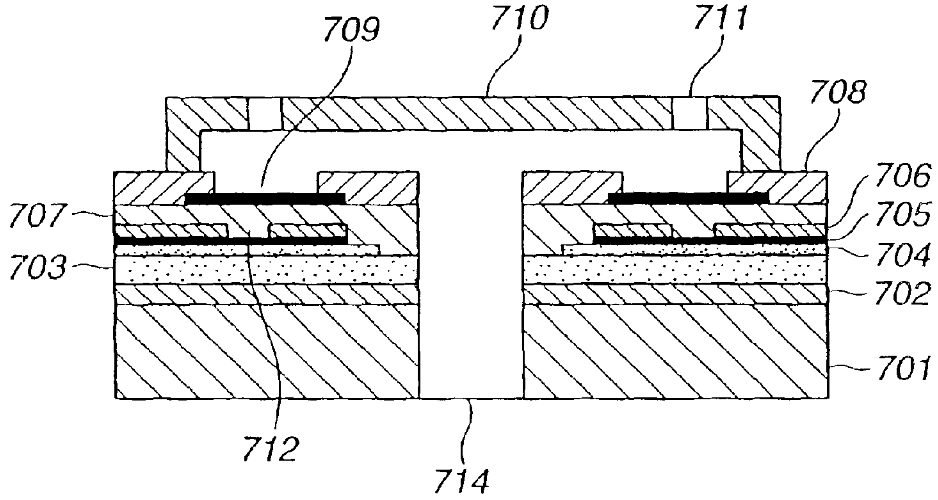
FIG. 18 is a schematic cross-sectional view illustrating a substrate for an ink-jet head according to the fourth embodiment.

Then, a SiOx film was deposited on this heat radiation layer 409 to a thickness of 15,000 Å as an insulating layer 704 (see FIG. 18). TaSiN heaters 705 having a thickness of 400 Å and a size of 24 $\mu$m square are arranged at both sides of the ink supply port at an interval of 42 $\mu$m. Al wires 706 having a thickness of 3,000 Å are connected to each heater, so as to supply the heater with an electric signal.

A SiN film was deposited on each heater to a thickness of 3,000 Å as a protective film 707. Then, a Ta film was deposited on the protective film 707 to a thickness of 2,300 Å as a cavitation-resistant film 709.

Figure 13A:
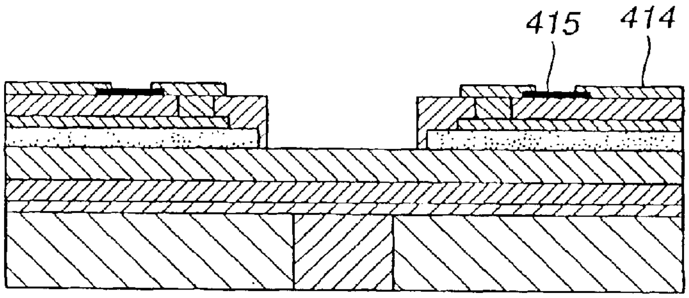
FIGS. 13A–13D are schematic cross-sectional views illustrating process flows for manufacturing the ink-jet head according to the fourth embodiment, after the state shown in FIG. 12C.
Figure 13B:
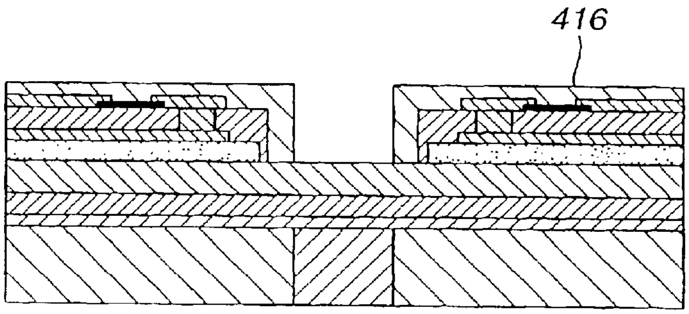
Figure 13C:
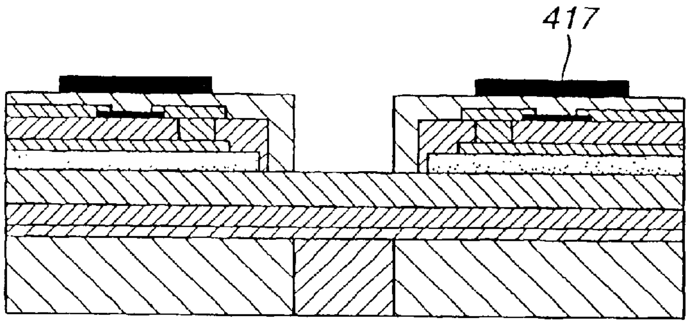
Figure 13D:
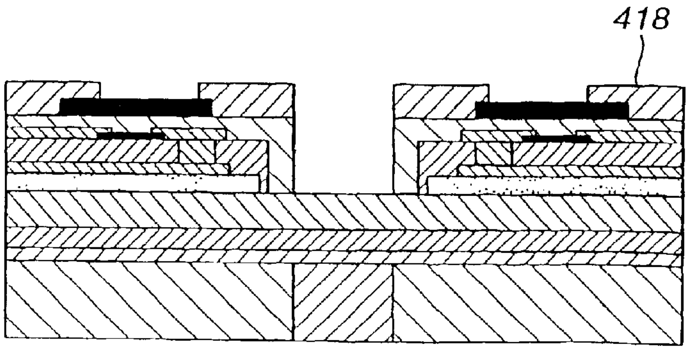

In order to improve the adhesive property of nozzles made of a resin, as shown in FIG. 13D, an alkali-resistant 418 film made of HIMAL (a product name, made by Hitachi Chemical Company, Limited) was formed to a thickness of 2 $\mu$m, and portions corresponding to heaters were obtained by patterning.

Figure 14A:
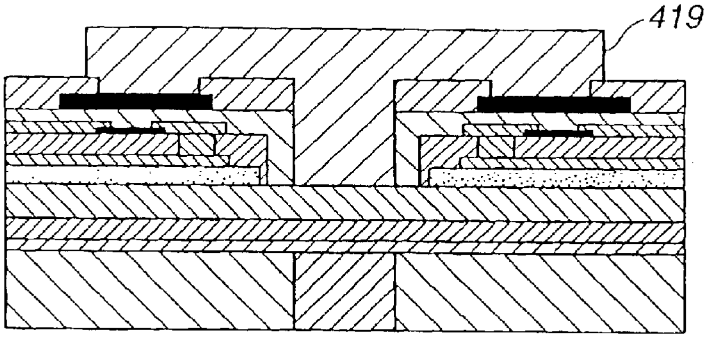
FIGS. 14A–14C are schematic cross-sectional views illustrating process flows for manufacturing the ink-jet head according to the fourth embodiment, after the state shown in FIG. 13D.
Figure 14B:
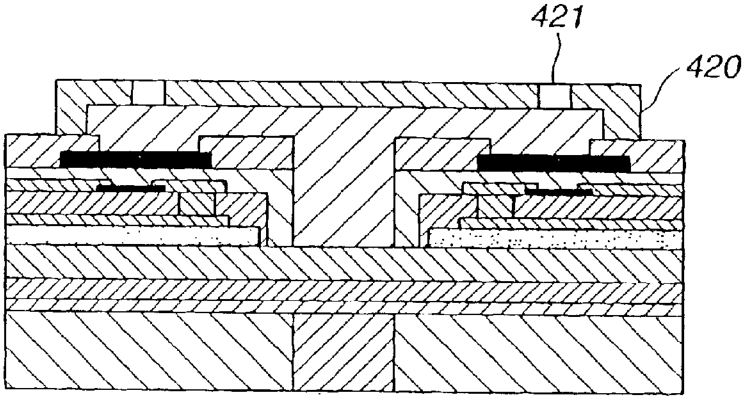
Figure 14C:
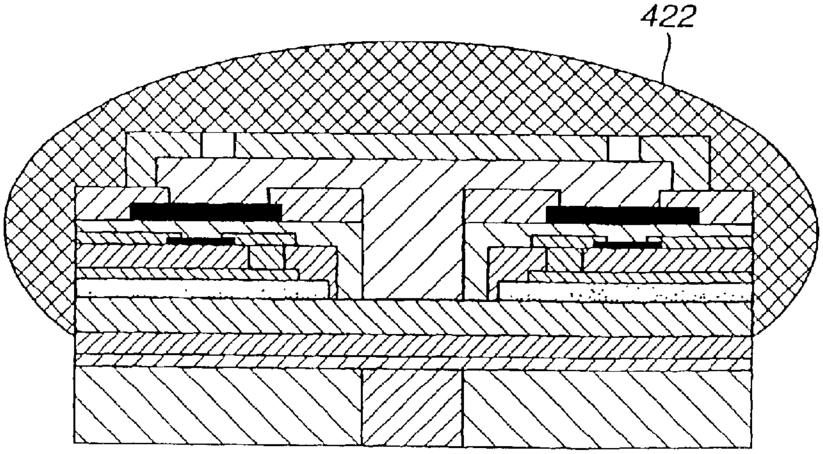

As shown in FIG. 14A, an ink-channel mold 419 was formed by coating polymethyl isopropenylketone (product name: ODUR-1010, made by Hitachi Chemical Company, Ltd.), serving as a photosensitive resin, to a thickness of 20 $\mu$m followed by patterning. Then, as shown in FIG. 14B, an ink discharge port 421 was formed immediately above each heater by coating a photosensitive resin 420, whose components are shown in Table 1, to a thickness of 12 $\mu$m and patterning the coated film.

Then, in order to protect the surface of the photosensitive resin layer 420 where nozzles are to be formed, a protective film 422 made of a rubber-type resist (product name: OBC, made by Tokyo Ohka Kogyo Co., Ltd.) was formed.

This substrate was etched by immersing it in a 22% TMAH aqueous solution, with an etchant temperature of 83° C., and an etching time of 3 hours.

Figure 15A:
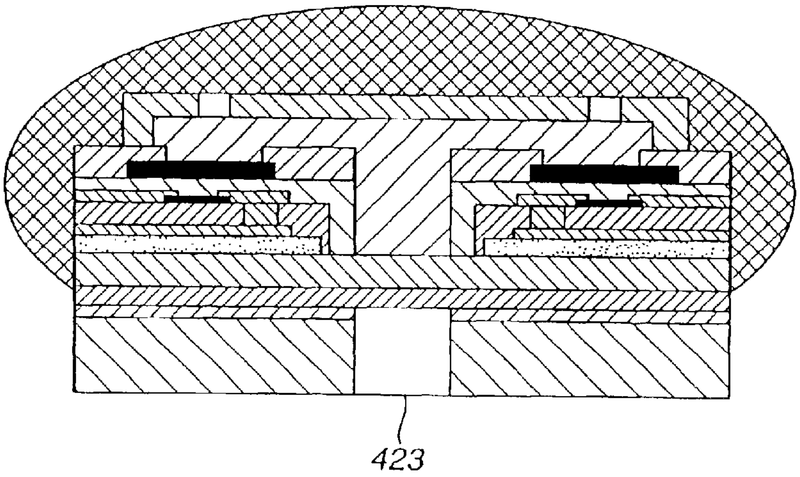
FIGS. 15A and 15B are schematic cross-sectional views illustrating process flows for manufacturing the ink-jet head according to the fourth embodiment, after the state shown in FIG. 14C.

The etching proceeded as shown in FIG. 15A, and stopped in front of the etching stop layer 408. At that time, no crack was observed in the etching stop layer 408, and penetration of the etching solution into the channel forming resin layer and the nozzle portions was not observed.

Figure 15B:
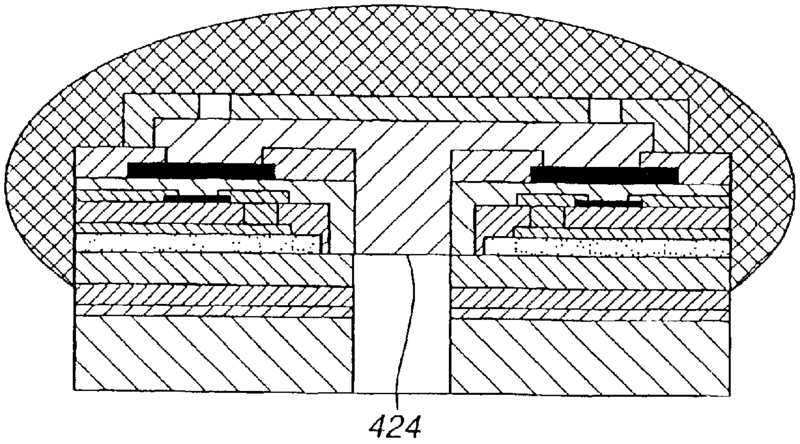

Then, as shown in FIG. 15B, SiN of the etching stop layer 408 and the polysilicon layer 409 above it were removed according to CDE, in etching conditions of $CF_4/O_2$=300/250 sccm, RF power of 800 W, and a pressure of 250 mtorr.

Figure 16A:
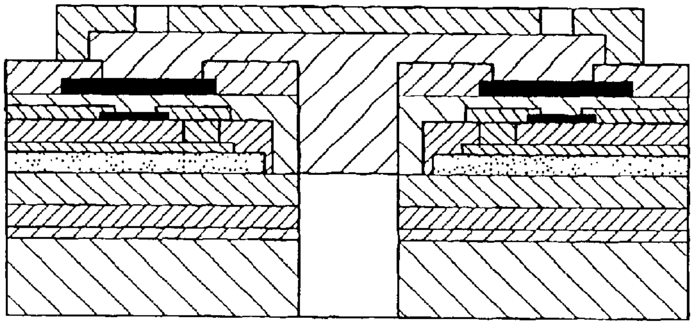
FIGS. 16A and 16B are schematic cross-sectional views illustrating process flows for manufacturing the ink-jet head according to the fourth embodiment, after the state shown in FIG. 15B.
Figure 16B:
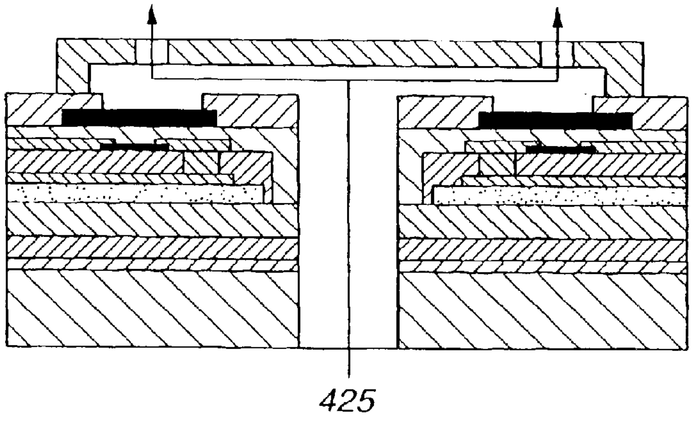

After removing the protective film 422, then, as shown in FIG. 16B, an ink channel 425 was formed by removing the channel forming resin by applying ultrasonic waves in methyl lactate. Thus, an ink-jet head as shown in FIG. 18 was manufactured.

Printing tests were performed using this ink-jet head with ink droplets of 4.5 pl and a discharge frequency of 8 kHz, and high-quality prints were obtained in which thinning in printing, unevenness in the print density, and absent of ink discharge were not observed over the entire width of 20 mm.

(Fifth Embodiment)

A method for manufacturing an ink-jet head according to a fifth embodiment of the present invention will now be sequentially described. In the following description, the same reference numerals as in the fourth embodiment will be omitted.

A threaded hole 402 having a width of 300 μm and a length of 20 mm was formed in an alumina substrate having an outer diameter of 6 inches and a thickness of 630 μm according to cutting.

The cutting was performed using a dicer having a diamond grindstone, with processing conditions, using a diamond blade having a grain size of 400 and a diameter of 55.6 mm, of a rotational speed of 2,500 rpm, an amount of pushing of 50 μm, a feeding speed of 5 mm/sec.

The processed substrate was placed on a carbon boat having a flat surface, and Ge powder having an average particle diameter equal to or less than 50 μm was provided in the supply port and on the surface of the substrate. Then, by melting the Ge powder at 980° C., the Ge power was made in a polycrystalline state, to provide a dense packed state.

Then, the thickness of the Ge layer on the surface of the alumina substrate was made 5 μm by polishing the portion filled with Ge. At that time, projections and recesses on the surface were suppressed to values equal to or less than 4,000 Å.

An etching stop layer made of SiN was deposited on the flattened substrate to a thickness of 2 μm according to plasma CVD, in film forming conditions of $SiH_4/NH_3/N_2$=160/400/2,000 sccm, a pressure of 1,600 mtorr, a substrate temperature of 300° C., and RF power of 1,400 W.

Then, a tungsten layer 206 was deposited on the SiN layer according to CVD, in film forming conditions of $WF_6/H_2/SiH_4$=300/3,000/100 sccm, a pressure of 100 mtorr, and a substrate temperature of 400° C.

Then, a $SiO_2$ film was deposited on the tungsten layer to a thickness of 8,000 Å according to plasma CVD, and the deposited film was patterned to form a heat storage layer, in film forming conditions of $SiH_4/N_2O/N_2$=250/1,200/4,000 sccm, a pressure of 1,800 mtorr, a substrate temperature of 300° C., and RF power of 1,800 W.

Then, lower wire electrodes were formed by depositing an AlCu film to a thickness of 3,000 Å and patterning the deposited film.

Then, interlayer insulating films were formed by depositing a $SiO_2$ film to a thickness of 12,000 Å according to plasma CVD in the same conditions as in the case of forming the lower wire electrodes. Then, contact holes were formed in the respective interlayer insulating films.

Heater portions are formed at portions adapted to the ink supply port, as ink-discharge-pressure generation elements. More specifically, a TaSiN film, serving as a heater layer, was deposited on the interlayer insulating film to a thickness of 500 Å according to sputtering, and the deposited film was patterned. Then, an AlCu film, serving as an upper electrode for supplying electric power, was deposited to a thickness of 2,000 Å according to sputtering.

In order to improve durability, a SiN film was deposited to a thickness of 3,000 Å according to plasma CVD. Then, a cavitation-resistant film was formed on the SiN film by depositing a Ta film to a thickness of 2,300 Å according to sputtering, and patterning the deposited film.

In order to improve the adhesive property of nozzles made of a resin, an alkali-resistant film made of HIMAL (a product name, made by Hitachi Chemical Company, Limited) was formed to a thickness of 2 μm, and portions corresponding to heaters were removed by patterning.

An ink-channel mold was formed by coating polymethyl isopropenylketone (product name: ODUR-1010, made by Hitachi Chemical Company, Ltd.), serving as a photosensitive resin, to a thickness of 20 μm followed by patterning. Then, a photosensitive-resin layer was formed by coating the substance having the components shown in Table 1 on the ink-channel mold to a thickness of 12 μm followed by patterning, to form ink discharge ports.

Then, in order to protect the surface of the photosensitive resin layer where nozzles are to be formed, a protective film made of a rubber-type resist (product name: OBC, made by Tokyo Ohka Kogyo Co., Ltd.) was formed.

Etching was performed by immersing this substrate in a 22% TMAH aqueous solution, with an etchant temperature of 83° C., and an etching time of 3 hours.

The etching stopped in front of the etching stop layer. At that time, no crack was observed in the etching stop layer, and penetration of the etching solution into the channel forming resin layer and the nozzle portions was not observed.

Then, SiN in the etching stop layer and the tungsten layer on the etching stop layer were removed according to CDE, in etching conditions of $CF_4/O_2$=300/250 sccm, RF power of 800 W, and a pressure of 250 mtorr.

After removing the protective film, an ink channel was formed by removing the channel forming resin by applying ultrasonic waves in methyl lactate. Thus, an ink-jet head was manufactured.

Electric external wires were connected to this ink-jet head, and printing tests were performed with ink droplets of 4.5 pl and a discharge frequency of 8 kHz, and high-quality prints were obtained in which thinning in printing, unevenness in the print density, and absent of ink discharge were not observed over the entire width of 20 mm.

As described above, according to the foregoing fourth and fifth embodiments, by forming an ink supply port in a ceramic substrate according to mechanical processing, and depositing a layer having a high heat radiating property on the ink supply port, it is possible to obtain a substrate for an ink-jet head having a sufficient mechanical strength in which excellent heat storing property and heat radiating property are in good balance.

By using such an inexpensive and large-area ceramic substrate, it is possible to provide an ink-jet head capable of performing high-quality printing.

As described above, according to the present invention, by forming an ink supply port in a ceramic substrate according to mechanical processing, and depositing a layer having a high heat radiating property on the ink supply port via a SiN film, it is possible to obtain a substrate for an ink-jet head having a sufficient mechanical strength in which excellent heat storing property and heat radiating property are in good balance.

By using such an inexpensive and large-area ceramic substrate, it is possible to provide an ink-jet head capable of performing high-quality printing.

The individual components shown in outline in the drawings are all well known in the ink-jet head arts and their specific construction and operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method for manufacturing an ink-jet head in which ink-discharge-pressure generation elements are provided on a substrate, discharge ports are disposed in a plate facing the ink-discharge-pressure generation elements, and ink is discharged from the discharge ports by generating bubbles within ink, said method comprising the steps of:

forming a threaded port, serving as an ink supply port, in a ceramic substrate;

filling the threaded port with a filler by melting the filler;

flattening a portion of the threaded port filled with the filler in the substrate;

depositing a silicon nitride film on a surface of the substrate in which the portion of the threaded port is flattened;

depositing a layer made of a high-heat-conduction material on the silicon nitride film;

forming the ink-discharge-pressure generation elements on the high-heat-conduction layer;

forming ink discharge portions having the corresponding discharge ports on the substrate having the ink-discharge-pressure generation elements; and removing the filler from the substrate having the ink discharge portions.

2. A method according to claim 1, wherein a processed portion for the ink supply port of the ceramic substrate is formed by molding before firing a green sheet.

3. A method according to claim 1, wherein a processed portion for the ink supply port of the ceramic substrate is formed by mechanical processing after firing a green sheet.

4. A method according to claim 1, wherein in said flattening step, a layer made of an inorganic material for filling voids on the surface of the substrate is formed on the surface of the substrate, and the layer made of the inorganic material is flattened, after said step of filling the threaded port with the filler.

5. A method according to claim 4, wherein the inorganic material includes silicon as a main component.

6. A method according to claim 4, wherein in said step of forming the layer of the inorganic material, the layer is formed by CVD (chemical vapor deposition).

7. A method according to claim 1, wherein the filler is also provided on the surface of the substrate as well as in the supply port, and fills voids in the supply port and the surface of the substrate.

8. A method according to claim 7, wherein the filler includes silicon as a main component.

9. A method according to claim 1, wherein the filler is a compound including Si.

10. A method according to claim 1, wherein the filler is a compound including Ge.

11. A method according to claim 1, wherein the ceramic substrate includes alumina as a main component.

12. A method according to claim 1, wherein the high-heat-conduction material includes polysilicon, tungsten or silicon carbide as a main component.

13. A method according to claim 1, wherein the layer made of the high-heat-conduction material has a thickness of 10–40 $\mu$m.

14. A method according to claim 1, wherein said step of removing the filler comprises a step of performing etching using an alkaline solution.

* * * * *

UNITED STATES PATENT AND TRADEMARK OFFICE

CERTIFICATE OF CORRECTION

PATENT NO. : 6,908,563 B2 Page 1 of 1
DATED : June 21, 2005
INVENTOR(S) : Hiroyuki Tokunaga It is certified that error appears in the above-identified patent and that said Letters Patent is hereby corrected as shown below:

Title page,
Item [57], ABSTRACT,
Line 9, "ports" should read -- port --.

Column 2,
Line 9, "vide" should read -- vides --.

Column 4,
Line 31, "order fill" should read -- order to fill --.

Column 5,
Line 28, "A" should read -- a --.

Column 7,
Line 28, "pattering" should read -- patterning --.

Column 8,
Line 49, "absent" should read -- absence --.

Column 11,
Line 11, "absent" should read -- absence --.

Column 12,
Line 44, "absent" should read -- absence --.

Signed and Sealed this

Seventh Day of February, 2006

JON W. DUDAS
*Director of the United States Patent and Trademark Office*